(12) United States Patent
Hayakawa et al.

(10) Patent No.: US 8,179,438 B2
(45) Date of Patent: May 15, 2012

(54) VEHICLE CAMERA SYSTEM

(75) Inventors: Jun Hayakawa, Hitachinaka (JP); Ken Ohsumi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 952 days.

(21) Appl. No.: 12/187,085

(22) Filed: Aug. 6, 2008

(65) Prior Publication Data

US 2009/0046150 A1 Feb. 19, 2009

(30) Foreign Application Priority Data

Aug. 7, 2007 (JP) ................. 2007-205805

(51) Int. Cl.
  *H04N 7/18* (2006.01)
  *H04N 5/225* (2006.01)
(52) U.S. Cl. .................. 348/148; 348/143; 348/373
(58) Field of Classification Search .................. 348/148, 348/143, 373
See application file for complete search history.

(56) References Cited

U.S. PATENT DOCUMENTS

2008/0001727 A1 1/2008 Ohsumi et al.

FOREIGN PATENT DOCUMENTS

JP 2006-33254 A 2/2006

*Primary Examiner* — Kamal Divecha
*Assistant Examiner* — Alan Chou
(74) *Attorney, Agent, or Firm* — Crowell & Moring LLP

(57) ABSTRACT

Disclosed herein is a vehicle camera system adapted for easy position matching of an image sensor and a lens assembly, and capable of being reduced in assembling time.

After accommodation of the image sensor 20 in a concave portion 16 of the lens assembly 10, when (a) first and second protrusions 31*a*, 31*b* of an elastic body 30 are inserted into first and second clearances 18*a*, 18*b*, respectively, and (b) the elastic body 30 is pressed from a direction of a circuit board 40, curved surfaces 15*a*, 15*b* convert the pressing direction into a force direction in which first and second datum planes 21*a*, 21*b* of the image sensor will be positioned with respect to first and second optical datum planes 12*a*, 12*b*, respectively, and the conversion results in first and second opposed planes 24*a*, 24*b* of the image sensor being positioned with respect to the first and second optical datum planes 12*a*, 12*b*, respectively, and a third datum plane 21*c* of the image sensor being positioned with respect to a third optical datum plane 12*c* by the force applied in the pressing direction.

5 Claims, 9 Drawing Sheets

VEHICLE CAMERA SYSTEM

BACKGROUND OF THE INVENTION

1. Field of the Invention

The present invention relates generally to vehicle camera systems that are mounted in automobiles. More particularly, the invention relates to a vehicle camera system improved in assembling efficiency and in assembling accuracy.

2. Description of the Related Art

During the fabrication of a conventional vehicle camera system, there has been a need to adjust and fix the relationship in position between an image sensor and lens assembly of the camera system in order to align the optical axes of these system constituent elements with each other. A large deal of assembling time has therefore been required during the adjustment of the optical axes.

For this reason, in a known camera structure, a resin-sealing portion with a convexity thereon is provided at a marginal portion of an image sensor, and a lens assembly is pressed against a home position on the resin-sealing portion by a two-dimensional elastic body. Thus, the image sensor and the lens assembly are positioned. Such a camera structure is proposed in JP-A-2006-33254, for example.

SUMMARY OF THE INVENTION

The camera structure described in JP-A-2006-33254, however, requires a resin-sealing step during the assembly of the camera, and hence, a correspondingly longer assembling time. In addition, since the image sensor and the lens assembly can only be two-dimensionally constrained with one elastic body, fixing in three-dimensional directions requires a plurality of elastic bodies, and hence, a longer assembling time.

An object of the present invention is to provide a vehicle camera system adapted for easy position matching of an image sensor and a lens assembly, and capable of being reduced in assembling time.

(1) In order to achieve the above object, a vehicle camera system that is an aspect of the present invention comprises: an image sensor for acquiring images of a motor vehicle periphery, the image sensor having three-dimensional datum planes; a circuit board with the image sensor mounted thereon; and a lens assembly with a lens for focusing an acquired image on the image sensor.
The lens assembly further has a concave portion for accommodating the image sensor. The concave portion of the lens assembly has: first, second, and third optical datum planes, each of which lies in any one of three-dimensional directions; first and second opposed planes of the lens assembly that are opposed to the first and second optical datum planes, respectively; and first and second force direction converters, one of which is provided between the third optical datum plane and the first opposed plane of the lens assembly, and the other is provided between the third optical datum plane and the second opposed plane of the lens assembly.

The camera system further comprises an elastic body having first and second protrusions. After the accommodation of the image sensor in the concave portion of the lens assembly, when (a) the first and second protrusions of the elastic body are inserted into first and second clearances, respectively, the first clearance being formed between a first image sensor opposed plane that is opposed to a first datum plane of the image sensor and the first opposed plane of the lens assembly, and the second clearance being formed between a second image sensor opposed plane that is opposed to a second datum plane of the image sensor and the second opposed plane of the lens assembly, and (b) the elastic body is pressed from a direction of the circuit board, the force direction converters convert the pressing direction to a force direction in which the first and second datum planes of the image sensor will be positioned with respect to the first and second optical datum planes, respectively, and the conversion results in the first and second datum planes of the image sensor being positioned with respect to the first and second optical datum planes, and a third datum plane of the image sensor being positioned with respect to the third optical datum plane by the force applied in the pressing direction.

This configuration of the camera system makes the image sensor and the lens assembly easy to match in position, and allows reduction in assembling time.

(2) In above item (1), the elastic body is preferably formed from silicone rubber.

(3) In item (1), the elastic body is preferably slitted at lower edges of the first and second protrusions.

(4) In item (1), the lens assembly preferably includes a snap-fit to fix the circuit board.

(5) In item (1), lengths of the first and second protrusions of the elastic body are preferably greater than depths of the first and second clearances.

According to the present invention, position matching between an image sensor and a lens assembly is facilitated and an assembling time can be shortened.

DESCRIPTION OF THE PREFERRED EMBODIMENTS

The configuration of a vehicle camera system according to an embodiment of the present invention will be described using FIGS. 1 to 15. Assembly of the vehicle camera system will also be described.

Figure 1:
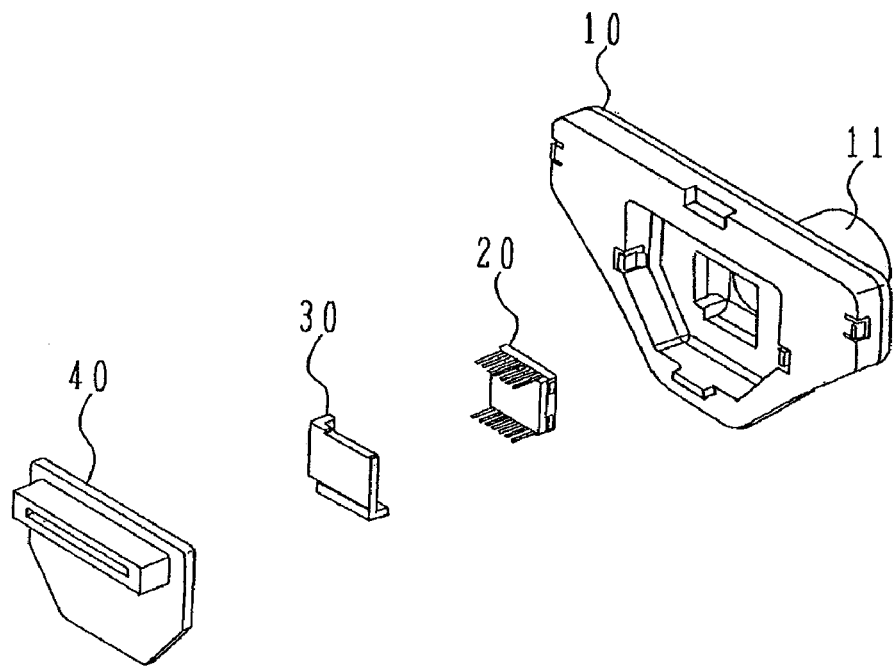
FIG. 1 is an exploded perspective view showing the configuration of a vehicle camera system according to an embodiment of the present invention.

The configuration of the vehicle camera system according to the present embodiment is first described using FIG. 1.

FIG. 1 is an exploded perspective view showing the configuration of the vehicle camera system according to the present embodiment.

The vehicle camera system according to the present embodiment includes a lens assembly 10, an image sensor 20, an elastic body 30, and a circuit board 40. Additionally, the lens assembly 10 has a lens barrel 11 including a lens (or lenses)

The lens barrel 11 contains one or more lenses. Although generally adapted to allow only lens focus to be adjusted independently of the lens assembly 10, the lens barrel 11 can be formed integrally with the lens assembly 10. In this case, a certain degree of defocusing can be absorbed by using a lens of a wider-focusing range (i.e., a lens with greater focal depth).

Detailed structures of each section of the vehicle camera system according to the present embodiment are next described using FIGS. 2 to 5.

Figure 2:
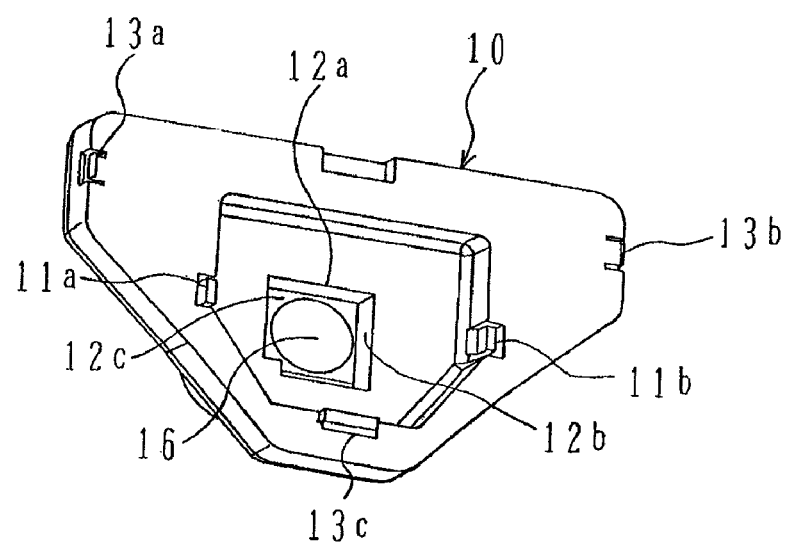
FIG. 2 is a perspective view showing the configuration of a lens assembly used in the vehicle camera system according to the embodiment.
Figure 3:
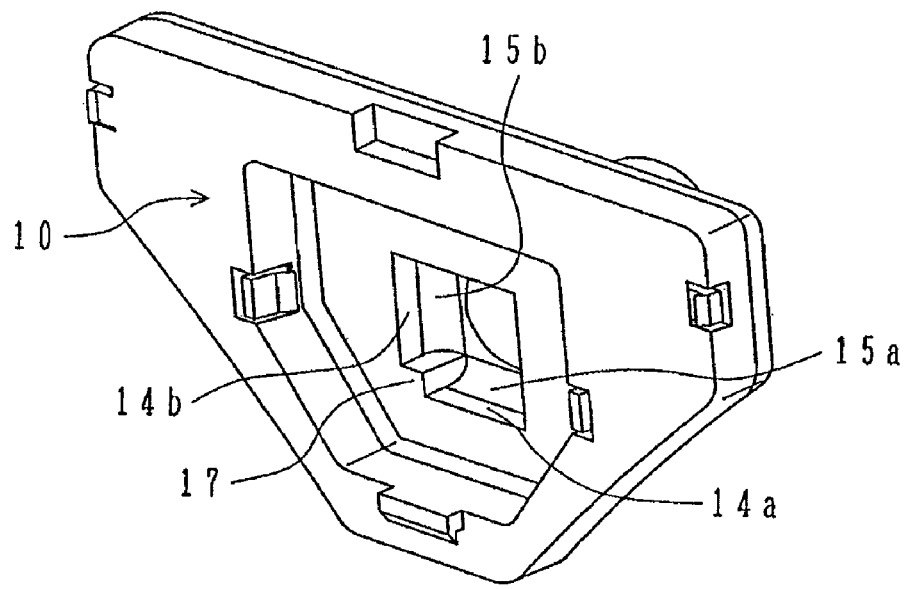
FIG. 3 is another perspective view showing the configuration of the lens assembly used in the vehicle camera system according to the embodiment.

The configuration of the lens assembly 10 used in the vehicle camera system according to the present embodiment is first described using FIGS. 2 and 3.

FIGS. 2 and 3 are perspective views showing the configuration of the lens assembly used in the vehicle camera system according to the present embodiment. The same reference numbers in FIGS. 2 and 3 designate the same sections.

The lens assembly 10 is formed of a high-strength plastic material such as polyphenylene sulfide (PPS). This is because the lens assembly needs to be formed with optical datum planes and because a material lower in price, in addition to being more resistant to thermal deformation, aged deterioration, vibration, and the like, is desirable.

As shown in FIG. 2, a rectangular concave portion 16 with a size large enough for accommodating the image sensor 20 shown in FIG. 1 is formed centrally in the lens assembly 10. Optical datum planes 12a, 12b, and 12c for position matching to the image sensor 20 are formed at the concave portion 16. The optical datum planes 12a, 12b, and 12c are each formed with greater planarity, and at a higher position, than any other plane. In addition, the first datum plane 12a, second datum plane 12b, and third datum plane 12c of the lens assembly are formed in three-dimensional directions so as to be perpendicular to one another.

As shown in FIG. 3, a first opposed plane 14a of the lens assembly is positioned to face the first datum plane 12a of the lens assembly, and a second opposed plane 14b of the lens assembly is positioned to face the second datum plane 12b of the lens assembly. A distance between the first datum plane 12a and first opposed plane 14a of the lens assembly, and a distance between the second datum plane 12b and second opposed plane 14b of the lens assembly are greater than vertical and horizontal sizes, respectively, of the image sensor 20 inserted into the concave portion 16.

The concave portion 16 includes a convexity 17 protruding in directions of the first lens assembly datum plane 12a and the second lens assembly datum plane 12b. If the image sensor 20 is inserted into the concave portion 16 intact, the convex portion 17 will be an obstruction to the insertion. In order to avoid this, therefore, the image sensor 20 is inserted with directionality proximate to the first lens assembly datum plane 12a and the second lens assembly datum plane 12b. A clearance is consequently formed between a lateral face of the image sensor 20, the first lens assembly opposed plane 14a, and the second lens assembly opposed plane 14b. A convex portion (described later herein) on the elastic body 30 shown in FIG. 1 is inserted into the above clearance. The insertion of this convex portion will be described later herein FIG. 10.

The lens assembly 10 further has a curved surface 15a between the first lens assembly datum plane 12a and the first lens assembly opposed plane 14a, and a curved surface 15b between the second lens assembly datum plane 12b and the second lens assembly opposed plane 14b. As will be described later herein FIG. 10, the curved surfaces 15a and 15b act as force direction converters.

Referring back to FIG. 2, the lens assembly 10 includes fixing portions 11a and 11b for fixing the circuit board 40 and the lens assembly 10. The fixing portions 11a and 11b are each of a no-screw structure, such as a snap-fit.

The lens assembly 10 also includes fixing portions 13a, 13b, and 13c for fixing a cover case 70 of the camera and for fixing the lens assembly 10. The fixing portions 13a, 13b, and 13c are each of a no-screw structure, such as a snap-fit.

Next, the configuration of the image sensor 20 used in the vehicle camera system according to the present embodiment is described below using FIG. 4.

Figure 4:
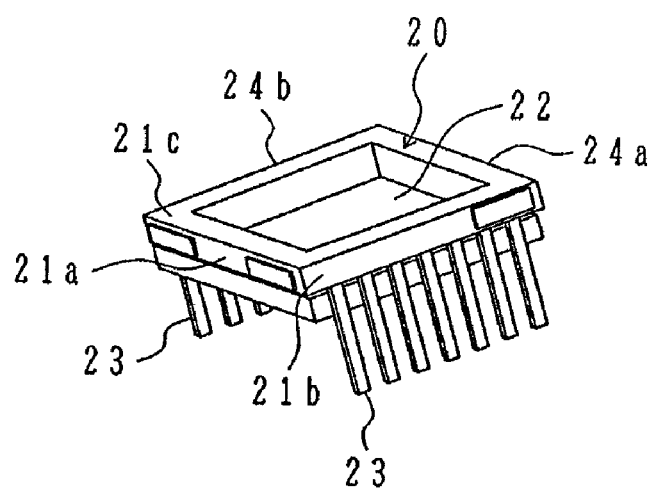
FIG. 4 is a perspective view showing the configuration of an image sensor used in the vehicle camera system according to the embodiment.

FIG. 4 is a perspective view showing the configuration of the image sensor used in the vehicle camera system according to the present embodiment.

The image sensor 20 is a device such as a charge-coupled device (CCD) or a complementary metal-oxide semiconductor (CMOS) device. The image sensor 20 has an imaging surface 22. After the lens assembly 10 has focused light, the image sensor 20 images the focused light on the imaging surface 22 and then converts the light into electrical signal form.

Also, the image sensor 20 has triaxial datum planes 21a, 21b, and 21c that serve as a basis for imaging on the imaging surface 22. The first datum plane 21a, second datum plane 21b, and third datum plane 21c of the image sensor are each formed in any one of three-dimensional directions so as to be perpendicular to one another.

A plane opposed to the first image sensor datum plane 21a is termed a first image sensor opposed plane 24a, and a plane opposed to the second image sensor datum plane 21b is termed a second image sensor opposed plane 24b.

In addition, the image sensor 20 has lead terminals 23 for establishing circuit-like connection to the circuit board 40 shown in FIG. 1.

Next, the configuration of the elastic body 30 used in the vehicle camera system according to the present embodiment is described below using FIG. 5.

Figure 5:
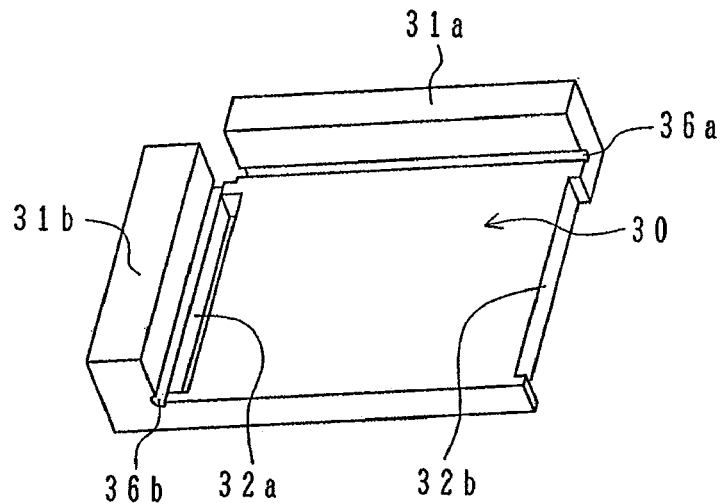
FIG. 5 is a perspective view showing the configuration of an elastic body used in the vehicle camera system according to the embodiment.

FIG. 5 is a perspective view showing the configuration of the elastic body used in the vehicle camera system according to the present embodiment.

The elastic body 30 is formed of a relatively soft material such as silicone rubber, and can be flexibly bended.

The elastic body 30 has protrusions 31a and 32b. The protrusions 31a and 32b are formed on adjoining sides of the elastic body 30, and are perpendicular to each other.

The elastic body 30 also has a hole 32a and notch 32b permitting the lead terminals 23 of the image sensor 20 in FIG. 4 to pass through.

Additionally, slits 36a and 36b for easy bending of the protrusions 31a and 31b of the elastic body 30 are formed basally at the protrusions 31a and 31b.

Next, an assembly process for the vehicle camera system according to the present embodiment is described below using FIGS. 6 to 11.

Figure 6:
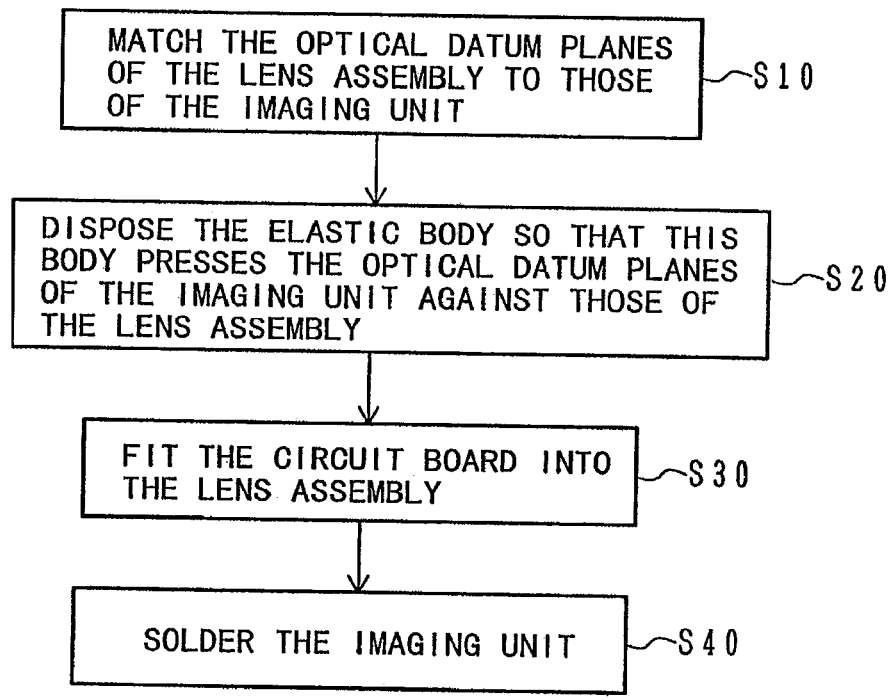
FIG. 6 is a flowchart that shows an assembly sequence relating to the vehicle camera system according to the embodiment.

FIG. 6 is a flowchart that shows an assembly sequence relating to the vehicle camera system according to the present embodiment. FIGS. 7 to 9 and 11 are perspective views that show states of the camera existing during the assembly of the vehicle camera system according to the embodiment. The same reference numbers in FIGS. 7 to 11 as used in FIGS. 1 to 5 designate the same sections.

Referring to FIG. 6, step S10 is executed to match the datum planes 21a, 21b, and 21c of the image sensor 20 to the optical datum planes 12a, 12b, and 12c, respectively, of the lens assembly 10.

Figure 7:
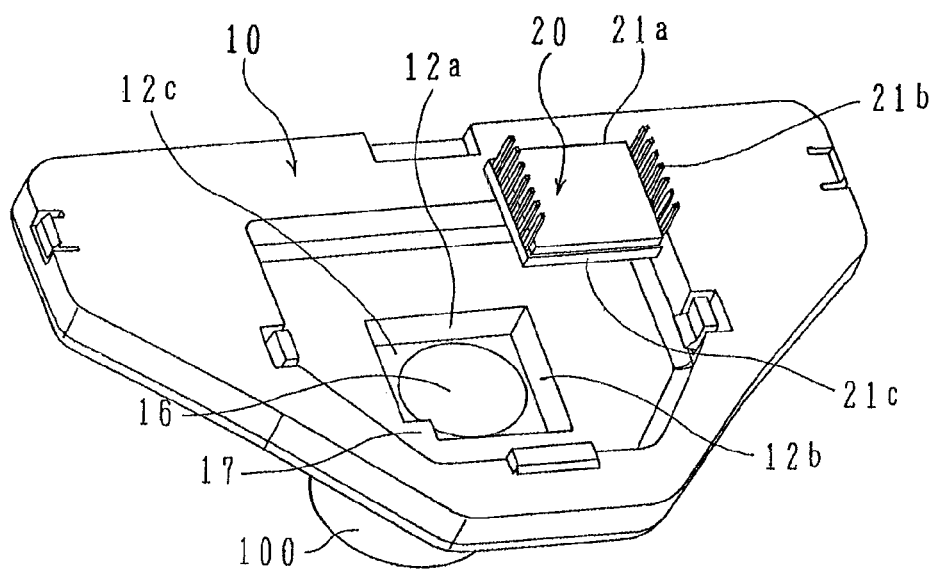
FIG. 7 is a perspective view showing a state of the camera existing during the assembly of the vehicle camera system according to the embodiment.

That is to say, as shown in FIG. 7, the datum planes 21a, 21b, and 21c of the image sensor 20 are matched to the optical datum planes 12a, 12b, and 12c, respectively, of the lens assembly 10. In this step, a face of the image sensor 20 that is opposite to the face having the lead terminals is directed towards the lens barrel 11 mounted on the lens assembly 10.

At this time, since the lens assembly 10 has the convex portion 17, the datum planes 21a, 21b, and 21c of the image sensor 20 can be easily matched to the optical datum planes 12a, 12b, and 12c, respectively, of the lens assembly 10, by matching the direction of the image sensor 20 properly and inserting the image sensor 20 into the concave portion 16 of the lens assembly 10. The third optical datum plane 12c of the lens assembly 10 and the third datum plane 21c of the image sensor 20 come into contact with each other. At this point of time, however, there is no need for the optical datum planes 12a and 12b of the lens assembly 10 to be in firm contact with the datum planes 21a and 21b, respectively, of the image sensor 20.

Next, step S20 in FIG. 6 is executed to dispose the elastic body 30 so that this body presses one of the optical datum planes of the image sensor 20 against the associated datum plane of the lens assembly.

Figure 8:
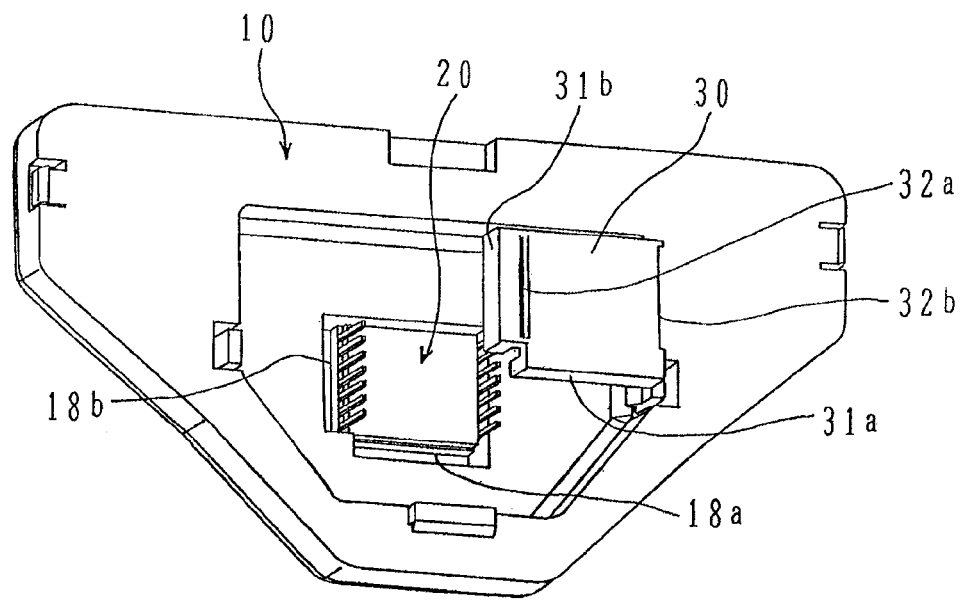
FIG. 8 is a perspective view showing another state of the camera existing during the assembly of the vehicle camera system according to the embodiment.

That is to say, as shown in FIG. 8, upon completion of step S10 in FIG. 6, clearances 18a and 18b are formed between the lens assembly 10 and the image sensor 20, i.e., at the above-mentioned optical datum plane of the lens assembly 10 and a plane of the image sensor that is opposite to the above datum plane thereof. More specifically, the clearance 18a is formed between the first lens assembly opposed plane 14a in FIG. 3 and the first image sensor opposed plane 24a in FIG. 4, and the clearance 18b is formed between the second lens assembly opposed plane 14b in FIG. 3 and the second image sensor opposed plane 24b in FIG. 4.

The elastic body 30 is disposed so that the protrusions 31a and 31b thereof are inserted into the clearances 18a and 18b respectively that are present between the lens assembly 10 and the image sensor 20. Additionally, since the elastic body 30 has the hole 32a and the notch 32b through which the lead terminals 23 of the image sensor 20 can be passed, the lead terminals 23 are passed through the hole 32a and the notch 32b simultaneously with the insertion of the protrusions 31a and 31b into the clearances 18a and 18b.

The elastic body 30 has non-electroconductive characteristics to prevent short-circuiting due to contact with the lead terminals 23 of the image sensor 20.

Next, the circuit board 40 is fitted into the lens assembly 10 in step S30 of FIG. 6. After being fitted into the lens assembly 10, the circuit board 40 is fixed to the lens assembly 10 via the fixing portions 11a and 11b thereof.

Figure 9:
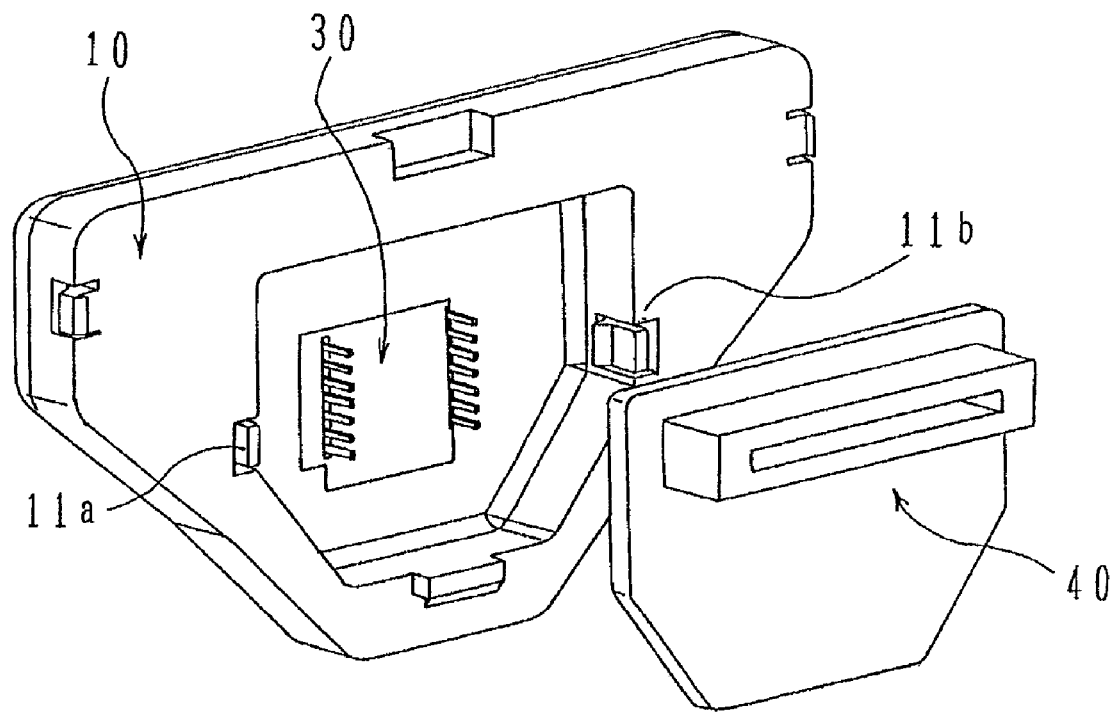
FIG. 9 is a perspective view showing yet another state of the camera existing during the assembly of the vehicle camera system according to the embodiment.

That is to say, as shown in FIG. 9, the circuit board 40 is fitted into the lens assembly 10 and then fixed using the fixing portions 11a and 11b provided on the lens assembly 10. During this fixing operation, the image sensor 20 can be easily positioned with respect to the lens assembly 10. This positioning operation will be described using FIGS. 10A, 10B, and 10C.

Principles of positioning during the assembly of the vehicle camera system according to the present embodiment are described below using FIGS. 10A to 10C.

Figure 10A:
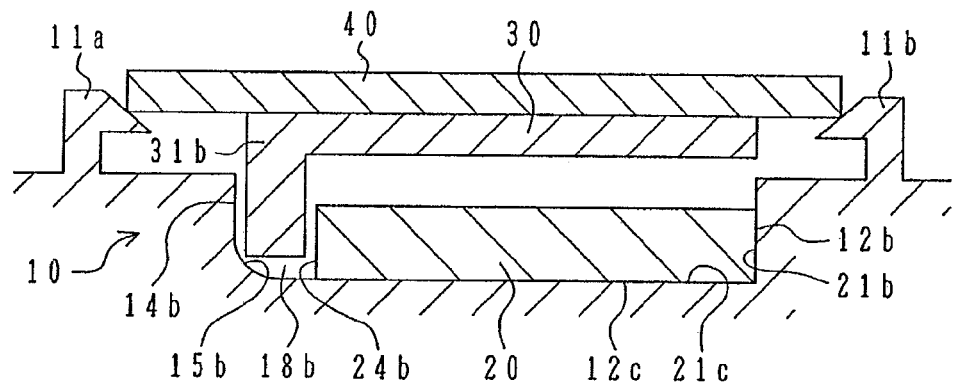
FIGS. 10A to 10C are explanatory diagrams of positioning principles during the assembly of the vehicle camera system according to the present embodiment.
Figure 10B:
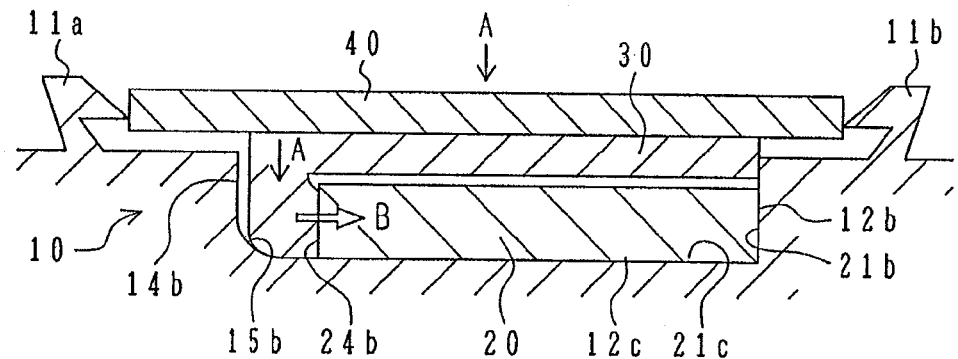
Figure 10C:
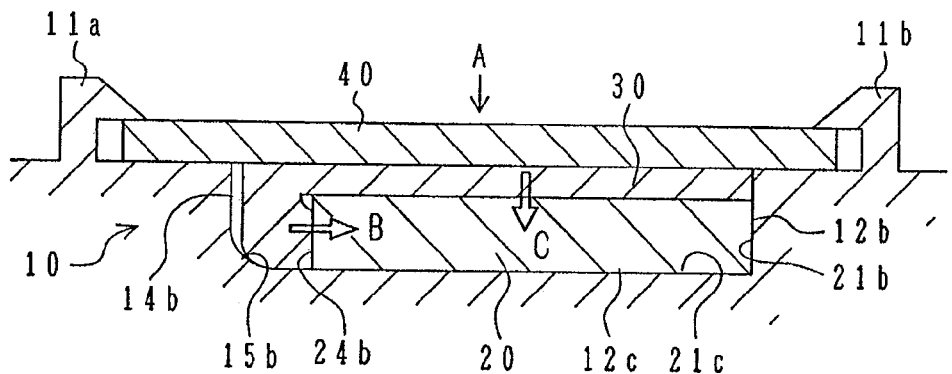

FIGS. 10A to 10C are explanatory diagrams of the positioning principles during the assembly of the vehicle camera system according to the present embodiment. The same reference numbers in FIGS. 10A to 10C as used in FIGS. 1 to 5 designate the same sections.

FIG. 10A shows a state immediately following the insertion of the protrusion 31b of the elastic body 30 into the clearance 18b present between the lens assembly 10 and the image sensor 20. Because of no external force being applied to the elastic body 30, the protrusion 31b retains an original shape without deforming. In addition, under this state, the third optical datum plane 12c of the lens assembly 10 and the third datum plane 21c of the image sensor 20 are in contact with each other. At this point of time, however, there is no need for the optical datum plane 12b of the lens assembly 10 and the datum plane 21b of the image sensor 20 to be in firm contact with each other.

FIG. 10B shows a state of the circuit board 40 being pressed against the elastic body 30 by a force A. At this point of time, the protrusion 31b of the elastic body 30 comes into contact with the curved surface 15b, and the force A deforms a front end of the protrusion 31b, along the curved surface 15b. As a result, the protrusion 31b comes into contact with the second opposed plane 24b of the image sensor 30, and a force B starts to press the second datum plane 21b of the image sensor 20 against the second datum plane 12a of the lens assembly 10. This means that the curved surface 15b operates to convert a direction of the force A to that of the force B. This conversion positions the second datum plane 21b of the image sensor 20 with respect to the second datum plane 12a of the lens assembly 10.

FIG. 10C shows a state of the circuit board 40 existing upon completion of the pressing operation with the force A. When the force A causes the circuit board 40 to depress the elastic body 30 with a force C, the elastic body 30 is pressed against an upper face of the image sensor 20. This positions the third datum plane 21c of the image sensor 20 with respect to the third optical datum plane 12c of the lens assembly 10, and fixes the circuit board 40 via connections (fixing portions) 11a and 11b.

The image sensor 20 and the lens assembly 10 are constructed so that after the datum plane 21b of the image sensor 20 has been pressed against the optical datum plane 12b of the lens assembly 10 on the same plane as that of the pressing force applied earlier, the datum plane 21c of the image sensor 20 is pressed against the optical datum plane 12c of the lens assembly 10. To this end, the protrusion 31b of the elastic body has a length greater than depth of the clearance 18b.

Thus, the protrusion 31b of the elastic body 30 is earlier bent by the pressing force A, and then the force C is generated in a direction of the image sensor 20, thereby pressing the sensor.

While the above description applies when the second datum plane 21b of the image sensor 20 and the second datum plane 12a of the lens assembly 10 are positioned using the protrusion 31b, the second datum plane 21b and second datum plane 12a shown in FIG. 7 are likewise positioned using the protrusion 31b shown in FIG. 5.

As shown in FIG. 5, the protrusions 31a and 31b of the elastic body 30 have slits 36a and 36b at respective basal portions, and the protrusions 31a and 31b can easily be bent as shown in FIG. 10B.

In addition, the elastic body 30 may be formed using a plurality of materials to enhance the bendability of the protrusions 31a, 31b.

The elastic body 30 provides stronger hermetic sealing by filling in the clearances between the imaging surface of the image sensor 20 and the lens assembly 10. Therefore, unnecessary moisture does not enter any sections between the imaging surface of the image sensor 20 and the lens assembly 10, and this characteristic prevents the imaging surface of the image sensor 20 from fogging.

The curved surface 15a and 15b acts as a force direction converter, so instead of this curved surface, any inclined section can be used, for example, only if the inclined section converts the direction of the force A into that of the force B.

Figure 11:
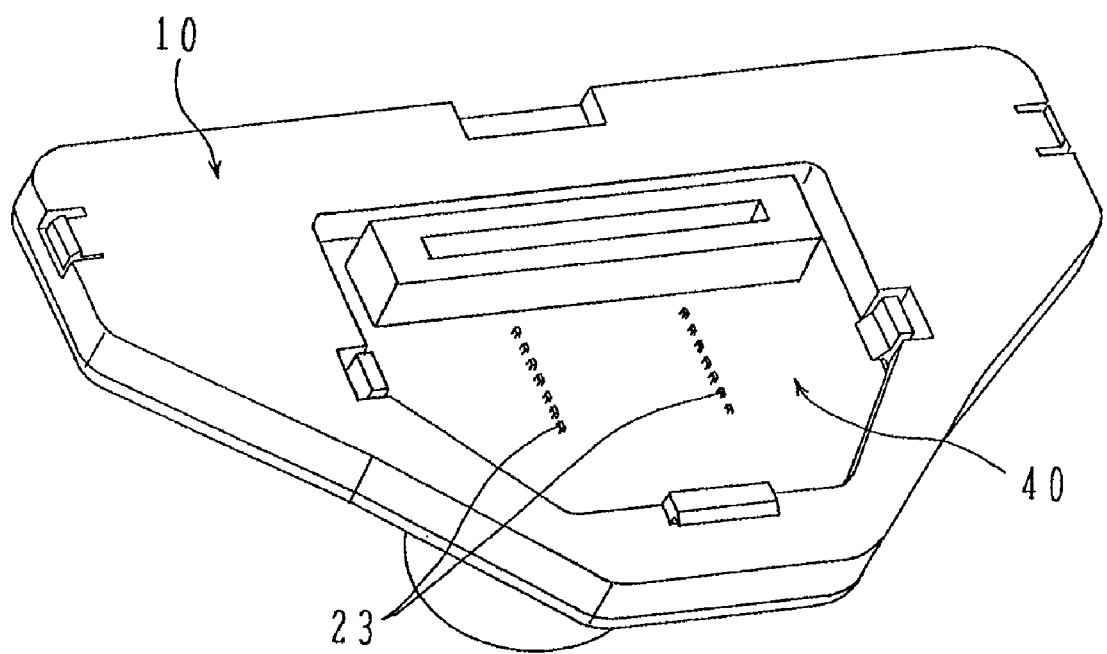
FIG. 11 is a perspective view showing still another state of the camera existing during the assembly of the vehicle camera system according to the embodiment.

Referring again to FIG. 6, step S40 is executed to solder the lead terminals 23 of the image sensor 20 onto the circuit board 40. That is to say, as shown in FIG. 11, the lead terminals 23 and the circuit board 40 are fixed by soldering.

Next, assembly of the circuit board, lens assembly, and cover case in the vehicle camera system according to the present embodiment will be described using FIGS. 12 to 14.

Figure 12:
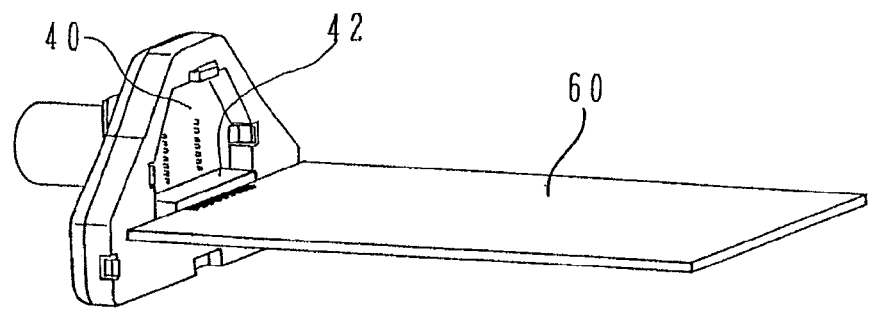
FIG. 12 is an explanatory diagram of an assembly process relating to a circuit board, lens assembly, and cover case used in the vehicle camera system according to the present embodiment.
Figure 13:
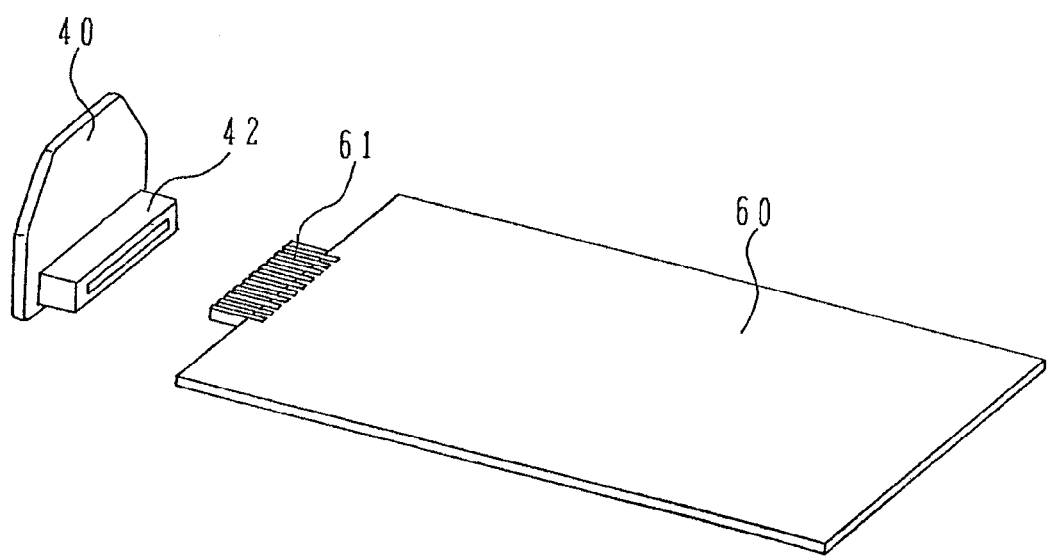
FIG. 13 is another explanatory diagram of the assembly process relating to the circuit board, lens assembly, and cover case used in the vehicle camera system according to the present embodiment.
Figure 14:
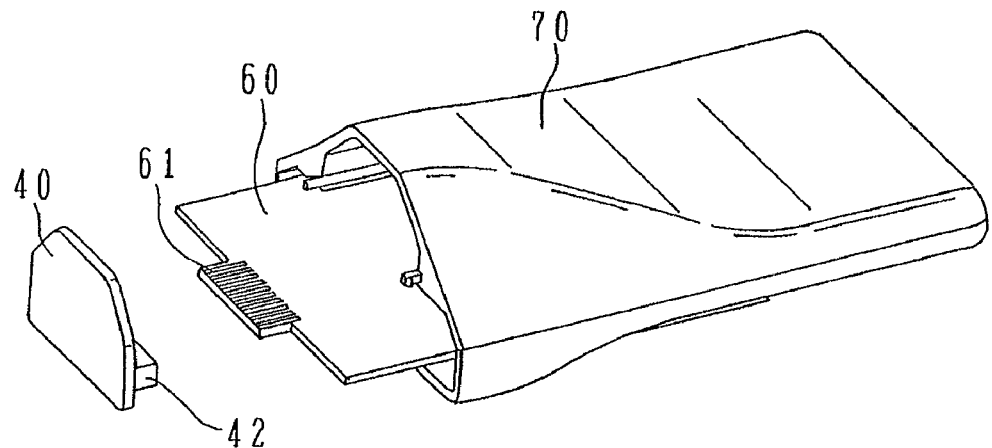
FIG. 14 is yet another explanatory diagram of the assembly process relating to the circuit board, lens assembly, and cover case used in the vehicle camera system according to the present embodiment.

FIGS. 12 to 14 are explanatory diagrams of an assembly process relating to the circuit board, lens assembly, and cover case in the vehicle camera system according to the present embodiment. The same reference numbers in FIGS. 11 to 14 as used in FIGS. 1 to 5 designate the same sections.

The vehicle camera system needs miniaturizing, since its installation location in the vehicle is limited for reasons associated with an imaging range. In particular, since the camera will be installed primarily near a rearview mirror inside the vehicle, it is desirable that the sections of the image sensor 20 that are arranged in the direction of the imaging surface be miniaturized to ensure as wide a driver's vision as possible.

Accordingly, only minimum necessary circuits relating to imaging, such as the image sensor 20, are mounted on the first circuit board 40, and other circuits are mounted on a second circuit board 60 through a connector 42.

On the first circuit board 40, as described per FIG. 11, the image sensor 30 is mounted, and as shown in FIGS. 12 and 13, the connector 42 and other elements are also mounted. Image data that the image sensor 20 has acquired on the first circuit board 40 is sent to the second circuit board 60 through the connector 42. A microcomputer, a power supply circuit, a vehicle connector, and other large components are mounted on the second circuit board 60. The camera system constituent elements in the direction of the imaging surface can be reduced in dimension by mounting large components on the second circuit board 60 in such a form.

Connector-to-connector connection, cable connection, connector-to-board connection, or the like can be used to interconnect the first circuit board 40 and the second circuit board 60. In terms of the ease in assembly, however, connector-to-board connection is desirable. As shown in FIG. 13, connector-to-board connection allows both circuit boards to be connected using only the connector 42 and a connecting terminal 61 of the second circuit board, and is also advantageous in costs since no cable is necessary.

Additionally, as shown in FIG. 14, connector-to-board connection is effective for reducing assembly man-hours, since the cover case 70 can be assembled together with the second circuit board 60 when coupled to the lens assembly.

The cover case 70 is formed in a non-glossy black color to minimize reflection onto a windshield.

Next, a form of vehicle mounting of the vehicle camera system according to the present embodiment is described below using FIG. 15.

Figure 15:
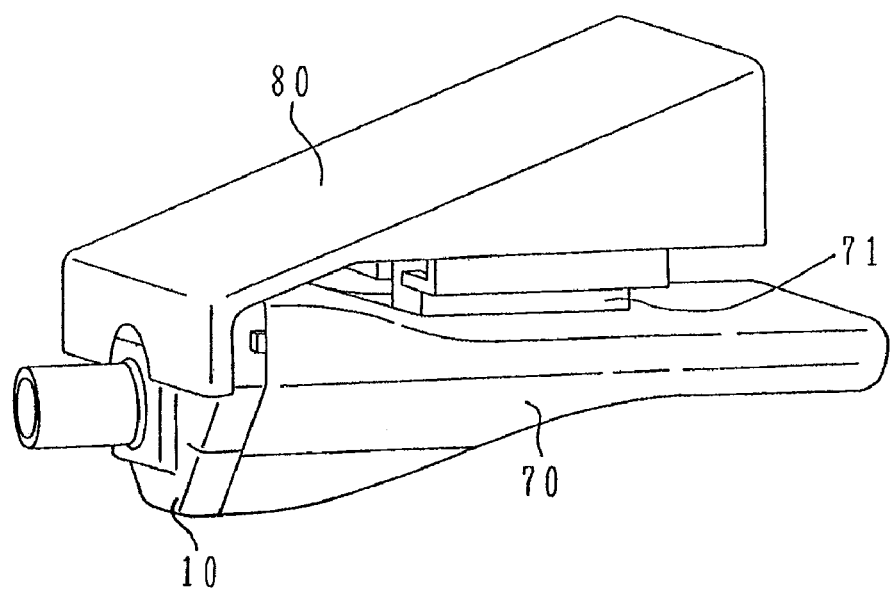
FIG. 15 is a perspective view showing an example of a form of installing the vehicle camera system of the present embodiment in a vehicle.

FIG. 15 is a perspective view showing an example of a form of installing the vehicle camera system of the present embodiment in the vehicle.

An attachment 80 for installing the vehicle camera system is mounted in the vehicle interior. The cover case 70 or the lens assembly 10 has a support 71 for connecting the case 70 or the assembly 10 to the attachment 80, and the support 71 is used to install the attachment 80. An upper planar section of the attachment 80 is installed so as to be in firm contact with the windshield, for example, of the vehicle.

In addition, the cover case 70 and the lens assembly are of a structure not degrading a layout or design of the vehicle interior and exterior.

As set forth above, according to the present embodiment, the assembling time required can be reduced since positions of the image sensor and the lens assembly can be matched with respect to each other via an elastic body in all three-dimensional directions by pressing or depressing the circuit board only from one specific direction.

What is claimed is:

1. A vehicle camera system for mounting in a motor vehicle, the camera system comprising:
   an image sensor for acquiring images of a vehicle periphery, the image sensor having three-dimensional datum planes;
   a circuit board with the image sensor mounted thereon; and
   a lens assembly with a lens for focusing an acquired image on the image sensor;
   wherein:
   the lens assembly further has a concave portion for accommodating the image sensor;
   the concave portion of the lens assembly includes
   first, second, and third optical datum planes, each of which lies in any one of three-dimensional directions,
   first and second opposed planes of the lens assembly, opposed to the first and second optical datum planes, respectively, and
   first and second force direction converters, one of which is provided between the third optical datum plane and the first opposed plane of the lens assembly, and the other is provided between the third optical datum plane and the second opposed plane of the lens assembly;
   the camera system further comprises an elastic body having first and second protrusions; and
   after the accommodation of the image sensor in the concave portion of the lens assembly, when
   the first and second protrusions of the elastic body are inserted into first and second clearances, respectively, the first clearance being formed between a first image sensor opposed plane that is opposed to a first datum plane of the image sensor and the first opposed plane of the lens assembly, and the second clearance being formed between a second image sensor opposed plane that is opposed to a second datum plane of the image sensor and the second opposed plane of the lens assembly, and the elastic body is pressed from a direction of the circuit board, the force direction converters convert the pressing direction to a force direction in which the first and second datum planes of the image sensor will be positioned with respect to the first and second optical datum planes, respectively, and the conversion results in the first and second datum planes of the image sensor being positioned with respect to the first and second optical datum planes, and a third datum plane of the image sensor being positioned with respect to the third optical datum plane by the force applied in the pressing direction.

2. The vehicle camera system according to claim 1, wherein:
the elastic body is formed from silicone rubber.

3. The vehicle camera system according to claim 1, wherein:
the elastic body is slitted at lower edges of the first and second protrusions.

4. The vehicle camera system according to claim 1, wherein:
the lens assembly includes a snap-fit to fix the circuit board.

5. The vehicle camera system according to claim 1, wherein:
lengths of the first and second protrusions of the elastic body are greater than depths of the first and second clearances.

* * * * *